(12) United States Patent
Chen et al.

(10) Patent No.: US 11,030,750 B2
(45) Date of Patent: Jun. 8, 2021

(54) MULTI-LEVEL CONVOLUTIONAL LSTM MODEL FOR THE SEGMENTATION OF MR IMAGES

(71) Applicants: Merck Sharp & Dohme Corp., Rahway, NJ (US); MSD International GmbH, Singapore (SG)

(72) Inventors: Antong Chen, Blue Bell, PA (US); Dongqing Zhang, Nashville, TN (US); Ilknur Icke, Attleboro, MA (US); Belma Dogdas, Ridgewood, NJ (US); Sarayu Parimal, Singapore (SG)

(73) Assignees: Merck Sharp & Dohme Corp., Rahway, NJ (US); MSD International GmbH, Singapore (KR)

( * ) Notice: Subject to any disclaimer, the term of this patent is extended or adjusted under 35 U.S.C. 154(b) by 81 days.

(21) Appl. No.: 16/427,171

(22) Filed: May 30, 2019

(65) Prior Publication Data

US 2020/0111214 A1 Apr. 9, 2020

Related U.S. Application Data

(60) Provisional application No. 62/740,908, filed on Oct. 3, 2018.

(51) Int. Cl.
*G06K 9/00* (2006.01)
*G06T 7/11* (2017.01)
(Continued)

(52) U.S. Cl.
CPC ............... *G06T 7/11* (2017.01); *G06K 9/36* (2013.01); *G06K 9/6229* (2013.01); *G06N 3/08* (2013.01);
(Continued)

(58) Field of Classification Search
CPC ............ G06K 9/6256; G06K 9/00335; G06K 9/00718; G06K 9/00805; G06K 9/6254;
(Continued)

(56) References Cited

U.S. PATENT DOCUMENTS

2016/0099010 A1\* 4/2016 Sainath ............... G06N 3/0445
704/232
2018/0268548 A1\* 9/2018 Lin ........................ G06N 3/084

OTHER PUBLICATIONS

Tseng, Joint Sequence Learning and Cross-Modality Convolution for 3D Biomedical Segmentation, Apr. 25, 2017, arXiv (Year: 2017).\*

(Continued)

*Primary Examiner* — Alex Kok S Liew
(74) *Attorney, Agent, or Firm* — Fenwick & West LLP (57) ABSTRACT

Approaches for the automatic segmentation of magnetic resonance (MR) images. Machine learning models segment images to identify image features in consecutive frames at different levels of resolution. A neural network block is applied to groups of MR images to produce primary feature maps at two or more levels of resolution. The images in a given group of MR images may correspond to a cycle and have a temporal order. A second RNN block is applied to the primary feature maps to produce two or more output tensors at corresponding levels of resolution. A segmentation block is applied to the two or more output tensors to produce a probability map for the MR images. The first neural network block may be a convolutional neural network (CNN) block. The second neural network block may be a convolutional long short-term (LSTM) block.

20 Claims, 7 Drawing Sheets

(51) Int. Cl.
  *G06N 3/08* (2006.01)
  *G06K 9/62* (2006.01)
  *G06T 7/143* (2017.01)
  *G06K 9/36* (2006.01)
(52) U.S. Cl.
  CPC .... *G06T 7/143* (2017.01); *G06T 2207/10088* (2013.01); *G06T 2207/20084* (2013.01); *G06T 2207/30048* (2013.01)
(58) Field of Classification Search
  CPC ..... G06K 2009/00738; G06K 9/00744; G06K 9/4628; G06K 9/00771; G06K 9/00791; G06K 2209/21; G06K 9/00006; G06K 9/00255; G06K 9/00281; G06K 9/00288; G06K 9/00342; G06K 9/00355; G06K 9/00369; G06K 9/00375; G06K 9/00671; G06K 9/00751; G06K 9/00765; G06K 9/00979; G06K 9/183; G06K 9/2054; G06K 9/3241; G06K 9/627; G06K 9/6271; G06N 3/08; G06N 3/0445; G06N 3/0454; G06N 3/084; G06N 20/10; G06N 3/04; G06N 5/003; G06N 3/082; G06N 5/046; G06N 20/00; G06N 5/04
  See application file for complete search history.

(56) References Cited

OTHER PUBLICATIONS

Tatsat, Multi-resolution CNN for brain vessel segmentation from cerebrovascular images of intracranial aneurysm: a comparison of U-Net and DeepMedic, 2020, SPIE, (Year: 2020).*

Zhang, D. et al., "A Multi-Level Convolutional LSTM Model for the Segmentation of Left Ventricle Myocardium in Infarcted Porcine Cine MR Images," 2018 IEEE 15th International Symposium on Biomedical Imaging (IBSI 2018), Apr. 4-7, 2018, pp. 470-473, Washington, D.C., USA.

Peng, P. et al., "A review of heart chamber segmentation for structural and functional analysis using cardiac magnetic resonance imaging," Magnetic Resonance Materials in Physics, Biology and Medicine, Apr. 2016, pp. 155-195, vol. 29, No. 2.

Petitjean, C. et al., "A review of segmentation methods in short axis cardiac MR images," Medical Image Analysis, Apr. 2011, pp. 169-184, vol. 15, No. 2.

Li, J. et al., "Automatic Whole-Heart Segmentation in Congenital Heart Disease Using Deeply-Supervised 3D FCN," RAMBO: International Workshop on Reconstruction and Analysis of Moving Body Organs, Oct. 17, 2016, pp. 111-118, Athens, Greece.

Tran, P.V., A Fully Convolutional Neural Network for Cardiac Segmentation in Short-Axis MRI, arXiv eprint arXiv: 1604.00494, Apr. 2016, 21 pages.

Poudel, R. P. et al., "Recurrent Fully Convolutional Neural Networks for Multi-slice MRI Cardiac Segmentation," arXiv eprint arXiv: 1608.03974, Aug. 13, 2016, 12 pages.

Nahrendorf, M. et al., "Cardiac magnetic resonance imaging in small animal models of human heart failure," Medical Image Analysis, Sep. 2003, pp. 369-375, vol. 7, No. 3.

Kim, K. A. et al., "Differentiation of Recently Infarcted Myocardium from Chronic Myocardial Scar: The Value of Contrast-Enhanced SSFP-Based Cine MR Imaging," Korean Journal of Cardiology, Mar. 2006, pp. 14-19, vol. 7, No. 1.

Hochreiter, S. et al., "Long Short-Term Memory," Neural Computation, Nov. 15, 1997, 49 pages, vol. 9, No. 8.

Liang, X. et al., "Semantic Object Parsing with Local-Global Long Short-Term Memory," arXiv preprint arXiv: 1511.04510, Nov. 14, 2015, 10 pages.

Zhang, X. et al., "Tree Recurrent Neural Networks with Application to Language Modeling," arXiv preprint arXiv: 1511.00060, Oct. 31, 2015, 15 pages.

Xue, W. et al., "Direct Estimation of Regional Wall Thicknesses via Residual Recurrent Neural Network," IPMI: International Conference on Information Processing in Medical Imaging, Jun. 25-30, 2017, pp. 505-516, Boone, North Carolina, USA.

Zhou, T. et al., "Automatic Segmentation of Left Ventricle in Cardiac Cine MRI Images Based on Deep Learning," SPIE Medical Imaging, Feb. 2017, nine pages, vol. 10133.

He, K. et al., "Deep Residual Learning for Image Recognition," The IEEE Conference on Computer Vision and Pattern Recognition (CVPR), 2016, pp. 770-778.

Shi, X. et al., "Convolutional LSTM Network: A Machine Learning Approach for Precipitation Nowcasting," NIPS' 15: Proceedings of the 28th International Conference on Neural Information Processing Systems, Dec. 2015, nine pages.

Kingma, D. P., "Adam: A Method for Stochastic Optimization," arXiv preprint arXiv: 1412.6980, Dec. 22, 2014, 15 pages.

Dice, L. R., "Measures of the Amount of Ecologic Association Between Species," Ecology, Jul. 1945, pp. 297-302, vol. 26, No. 3.

Huttenlocher, D. P. et al., "Comparing images using the Hausdorff distance," IEEE Transactions on Pattern Analysis and Machine Intelligence, Sep. 1993, pp. 850-863, vol. 15, No. 9.

Radau, P. et al., "Evaluation Framework for Algorithms Segmenting Short Axis Cardiac MRI," The MIDAS Journal-Cardiac MR Left Ventricle Segmentation Challenge, Jul. 9, 2009, seven pages, [Online] [Retrieved on Feb. 28, 2020], Retrieved from the Internet <URL: https://www.midasjournal.org/browse/publication/658>.

* cited by examiner

MULTI-LEVEL CONVOLUTIONAL LSTM MODEL FOR THE SEGMENTATION OF MR IMAGES

CROSS-REFERENCE TO RELATED APPLICATION

This application claims benefit of U.S. Provisional Patent Application Ser. No. 62/740,908 filed Oct. 3, 2018, which is hereby incorporated by reference in its entirety.

TECHNICAL FIELD

The disclosure generally relates to the field of image processing, and in particular to the automatic segmentation of magnetic resonance (MR) images.

BACKGROUND

Automatic segmentation of MR images acquired on subjects is a challenging task, mainly because of the various types of image inhomogeneity in image subject matter. Among the approaches proposed to automate the segmentation task, methods based upon deep convolutional neural networks have demonstrated their exceptional accuracy and robustness in recent years. However, one problem with typical approaches using neural networks is that they fail to capture potentially valuable spatial-temporal dynamics between consecutive frames. An example of another problem encountered is accounting for local intensity decreases in images. For example, when viewing heart tissue images of diseased specimens, such as from infarction, tissue thinning (e.g., myocardial thinning) and tissue lesions can cause local intensity decreases. Both problems can lead to observable inhomogeneities in a set of images captured during cycles of motion (e.g., images of a left ventricle myocardium during heart motion), limiting the usefulness and reliability of the segmented images.

SUMMARY

Embodiments relate to a model for the automatic segmentation of MR images. Machine learning models, such as a convolutional neural network (CNN) and a recurrent neural network (RNN), segment images to identify image features in consecutive frames at different levels of resolution. Users may be provided the segmented images in a user interface.

In various embodiments, a computer-implemented method of image segmentation includes receiving MR images in groups. The method also includes applying a neural network block to the MR images to produce primary feature maps at two or more levels of resolution. The method further includes applying a RNN block to the primary feature maps at the two or more levels of resolution to produce two or more output tensors at corresponding levels of resolution. The method further includes applying a segmentation block to the two or more output tensors. The method further includes obtaining the results of the segmentation block as a probability map.

The second neural network block may be a RNN block. The method of image segmentation may further include training the RNN block by initializing weights of the RNN block, applying the first neural network block to a set of MR images, applying the RNN block to the output of the first neural network block, applying a segmentation block to the output of the RNN block to generate predictions of a location of a feature within each MR image in the set of MR images, and updating the weights of the RNN block based on the predictions. The second neural network block may be a convolutional long short-term (LSTM) block. The method of applying the segmentation block may further include concatenating the two or more output tensors at corresponding levels of resolution into an output tensor, deconvoluting the output tensor, and applying a sigmoid activation function to the output tensor to produce a probability map. The first neural network block may be a CNN block.

The method of image segmentation may further include preprocessing the MR images. Preprocessing may include at least one of: resampling the MR images, cropping the MR images, performing motion analysis on the MR images, or performing transforms on the MR images. The images in a given group of MR images may correspond to a cycle and have a temporal order. The first neural network may be applied to the MR images in the given group in the temporal order.

In other embodiments, an image segmentation system is stored on a non-transitory machine-readable storage medium. The image segmentation system is manufactured by a process including receiving MR images in groups. The process further includes applying a neural network block to the MR images to produce primary feature maps at two or more levels of resolution. The process further includes applying a RNN block to the primary feature maps at the two or more levels of resolution to produce two or more output tensors at corresponding levels of resolution. The process further includes applying a segmentation block to the two or more output tensors. The process further includes obtaining the results of the segmentation block as a probability map.

In further embodiments, the image segmentation system includes a hardware processor and a non-transitory computer-readable medium that contains instructions that cause the hardware processor to receive MR images in groups. The instructions further cause the processor to apply a first neural network block to the MR images to produce feature maps at two or more levels of resolution. The instructions further cause the processor to apply a second neural network block to the feature maps at the two or more levels of resolution to produce two or more output tensors at corresponding levels of resolution. The instructions further cause the processor to apply a segmentation block to the two or more output tensors. The instructions further cause the processor to obtain the results of the segmentation block as a probability map.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG.) 1 illustrates a diagram of a system environment of an image segmentation system, according to one embodiment.

DETAILED DESCRIPTION

The Figures (FIGS.) and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures. It is noted that wherever practicable similar or like reference numbers are used in the figures to indicate similar or like functionality.

Overview of Method

Figure 1:
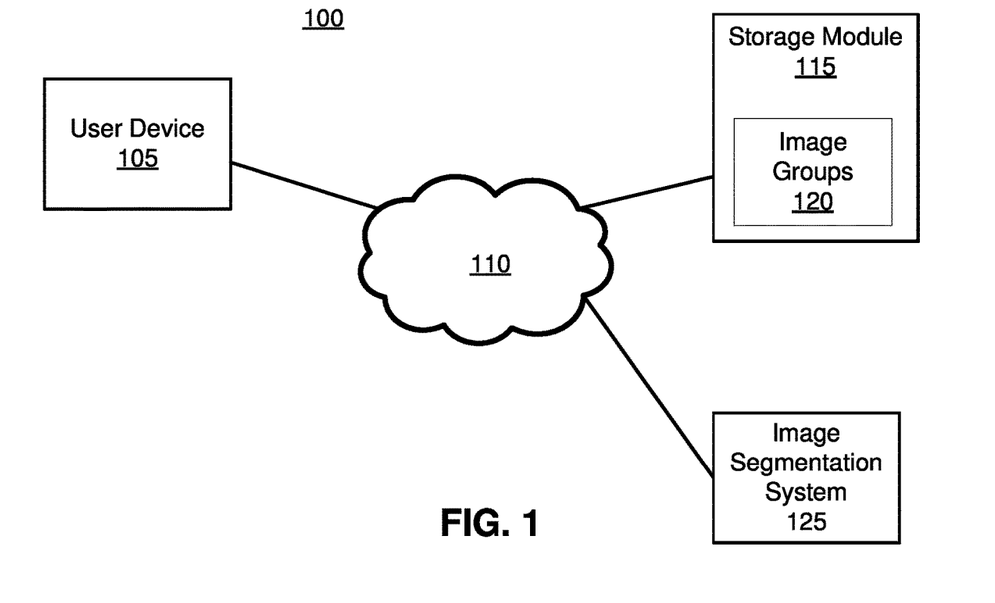

FIG. 1 illustrates one embodiment of a system environment 100 of an image segmentation system. In the embodiment shown, the environment 100 includes a user device 105, a network 110, a storage module 115, and an image segmentation system 125. In other embodiments, the system environment 100 includes different and/or additional elements. In addition, the functions may be distributed among the elements in a different manner than described.

The user device 105 is one or more computing devices capable of receiving user input as well as transmitting and/or receiving data via a network 110. In one embodiment, a user device 105 is a computer system, such as a desktop or a laptop computer. Alternatively, a user device 105 may be a device having computer functionality, such as a personal digital assistant (PDA), a mobile telephone, a smartphone, or another suitable device. A user device 105 is configured to communicate via the network 110. The user device 105 may execute an application allowing a user of the user device 105 to interact with the image segmentation system 125 via a user interface. For example, a web browser application may enable interaction between the user device 105 and the image segmentation system 125 via the network 110 or a graphical user interface may be provided as part of a software application published by the image segmentation system 125 and installed on the user device 105. Alternatively, a user device 105 interacts with the image segmentation system 125 through an application programming interface (API) running on a native operating system of the user device 105, such as IOS® or ANDROID™.

The storage module 115 is one or more machine-readable media that store groups of images. The storage module 115 may receive and store images from a user device 105, the image segmentation system 125, third-party databases, and the like. In some embodiments, images are MR images taken of one or more subjects. Images taken consecutively may have spatial and temporal dependence. For example, consecutive images may correspond to a set of frames captured during a single cycle of motion (e.g., short axis MR images of a left ventricle myocardium during a single cardiac cycle). Images that are used for training the image segmentation system 125 are stored as image groups 120. Images may be grouped in various configurations. For example, images may be grouped by subject, region of interest, cycle of motion, period within a cycle of motion (e.g., diastole, systole, etc.), and the like. In one embodiment, a module with similar or identical functionality to the storage module 115 is integrated into the image segmentation system 125.

The image segmentation system 125 segments images (e.g., MR images) that have spatial and temporal dependencies. For example, images that represent image frames captured within a cycle of motion. The image segmentation system captures the spatial-temporal characteristics of images by processing images at multiple levels of resolution. To do this, the image segmentation system 125 use a CNN block in conjunction with a RNN block (e.g., a convolutional long short-term memory (ConvLSTM)) block to model spatial continuity between regions of interest in adjacent image frames. In one embodiment, the image segmentation system 125 outputs a probability map of each image it processes. The probability map at each grid point (e.g., pixel) within an image indicates the likelihood that the grid point is a part of a region of interest. Various embodiments of the image segmentation system 125 are described in greater detail below, with reference to FIGS. 2 through 4B.

The user device 105, storage module 115, and image segmentation system 125 are configured to communicate via a network 110, which may include any combination of local area and/or wide area networks, using both wired and/or wireless communication systems. In one embodiment, a network 110 uses standard communications technologies and/or protocols. For example, a network 110 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 110 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over a network 110 may be represented using any suitable format, such as hypertext markup language (HTML) or extensible markup language (XML). In some embodiments, all or some of the communication links of a network 110 may be encrypted using any suitable technique or techniques.

Figure 2:
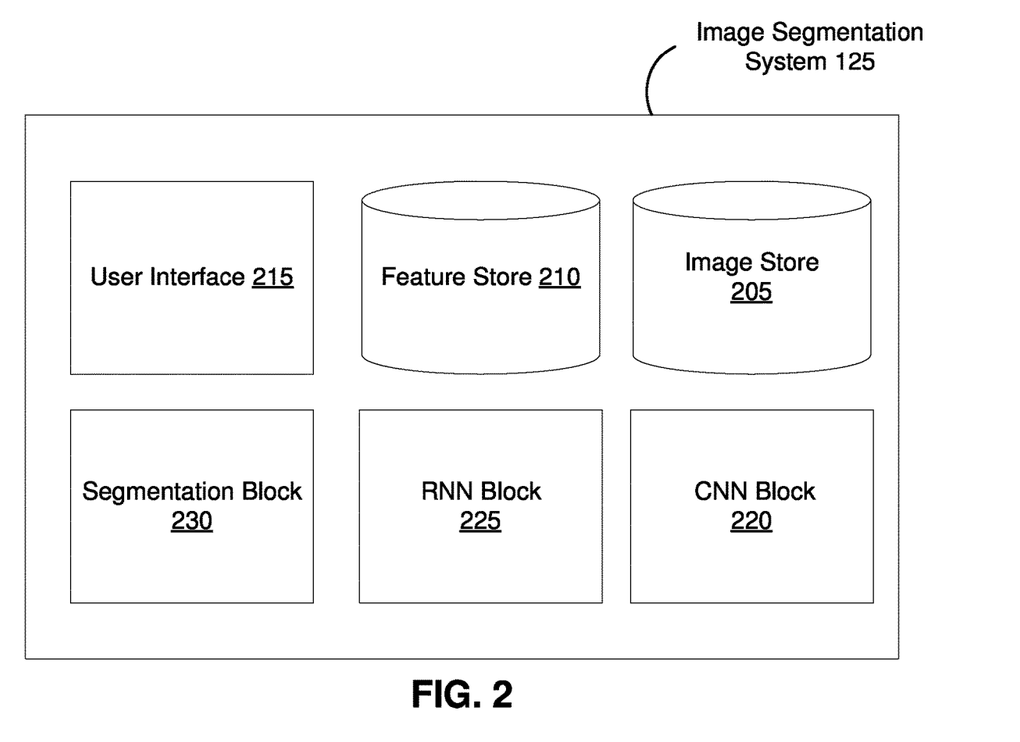
FIG. 2 is a block diagram of an architecture of the image segmentation system, according to one embodiment.

FIG. 2 shows one embodiment of the image segmentation system 125 of FIG. 1. In the embodiment shown in FIG. 2, the image segmentation system 125 includes an image store 205, a feature store 210, a user interface 215, a CNN block 220, an RNN block 225, and a segmentation block 230. In other embodiments, the image segmentation system 125 includes different and/or additional elements. In addition, the functions may be distributed among the element in a different manner than described.

The image segmentation system 125 maintains images and image data in the image store 205. In one embodiment, the image store 205 stores the original, preprocessed, and segmented versions of images. In some embodiments, images may be preprocessed before segmentation. In some embodiments, during preprocessing, each image is resampled to 1×1 $m^2$ pixel size and cropped to a 184×184 matrix from the center. Additional feature localization may be performed. For example, motion analysis may be performed on images to obtain information based on their apparent motion. Transforms may also be applied to images, such as Hough transforms, to detect circles such that a bounding box enclosing the feature is defined by a set margin. The image store 205 may also store metadata for the images. Metadata may include date and time of image capture, preprocessing, or segmentation; author; device identification; camera settings; subject identification label; and the like.

The image store 205 may also maintain copies of images that have been manually segmented to label one or more regions of interest within the images. Labeled images are used during training and validation of the CNN block 220 and RNN block 225. Labeled images are grouped such that each group consists of the number of frames in a single cycle (e.g., 10, 25, 50 frames per cycle). The labeled images may also be maintained in their original temporal order. Alternatively, the CNN block 220 and RNN block 225 may be trained by a different system and copied to the image segmentation system 125 once trained and validated. In such cases, the image store 205 may not contain labeled images.

When preparing a set of images for training or validation, users may manually segment training images using a user interface. This may be part of the user interface or, as described previously, may be a separate process performed on a system other than the image segmentation system 125. Regardless of the system used to prepare training images, users may also select one or more regions of interest that should be identified during image segmentation using interactive interface elements.

The image segmentation system 125 maintains the results of image segmentations in the feature store 210. Results of the image segmentation may include the probability maps generated during image segmentation. The feature store may also store the location of the identified regions of interest in each image. For example, the location coordinates of the region of interest identified by the image segmentation system 125. The feature store may also store the location coordinates of regions of interest in the training and validation sets of images. For example, the location coordinates of the regions of interest in images that have been manually segmented. In some embodiments, the feature store 210 may also store the output of each of the CNN block 220, RNN block 225, and segmentation block 230. In these embodiments, each block retrieves the output of a preceding block from the feature store 210.

Users may provide images to the image segmentation system 125 via the user interface 215. For example, the user may be prompted in an element of a user interface to upload images to the image segmentation system 125. The user interface 215 may provide additional elements to the user to add grouping information to images. For example, the user interface 215 may include elements that allow the user to indicate which group an image is a member of, the number of cycles in a group, the number of frames captured during a cycle of motion, subject information (e.g., material captured, subject identification number, etc.). The user interface 215 may also include additional elements that allow the user to select the number of levels of resolution used during image segmentation.

The trained CNN block 220 is applied to the images provided by the user via the user interface 215 to generate two or more primary feature maps, each map corresponding to a level of resolution. The RNN block 225 is then applied to the primary feature maps generated by the CNN block 220 to produce two or more output tensors. The segmentation block 230 is applied to the two or more output tensors to produce probability maps for the images. The probability maps may be used to label a predicted region of interest within the images. The results of the image segmentation system 125 may be presented to users on the user interface 215. For example, the segmented images, the accuracy and recall of the segmentation, final block parameters, and the like may all be accessed by a user via the user interface 215.

The CNN block 220 includes CNN architecture that can effectively extract image features from images. The CNN block 220 extracts features from images to produce primary feature maps at different levels of resolution. By extracting features at multiple levels of resolution, features at both refined and coarse levels are able to contribute to the generation of segmentation results. The CNN block 220 includes ResNet building units. Blocks of ResNet building units collectively produce feature maps that are downsampled to produce primary feature maps at two or more levels of resolution. In some embodiments, the CNN block 220 may be a fully convolutional 56-layer residual learning network. In other embodiments, the CNN block 220 contains any CNN architecture than can effectively extract image features at multiple levels of resolution. The CNN block 220 is discussed in detail below, with reference to FIG. 3A.

The RNN block 225 processes the primary feature maps generated by the CNN block 220 at the multiple levels of resolution. The RNN block 225 includes two or more long short-term (LSTM) blocks, each dedicated to processing a primary feature map at a corresponding level of resolution. In some embodiments, LSTM blocks are convolutional long short-term memory (ConvLSTM) blocks. The convolution operation of ConvLSTM reduces the number of model parameters and captures the spatial relation between voxels more effectively than conventional LSTM. Each LSTM block contains a series of LSTM units that are serially connected. In some embodiments, the number of units corresponds to the number of frames captured in a cycle of motion. For example, if there are 25 frames taken during a single cycle of motion, each LSTM block would contain 25 LSTM units. The architecture of an example LSTM block and an example LSTM unit are discussed below, with reference to FIGS. 4A and 4B, respectively. The RNN block outputs output tensors at each level of resolution. Elements of an output tensor represent features within a corresponding image.

The segmentation block 230 produces a probability map for each image. In the probability map, the probability at each region (e.g., pixel) within an image indicates the likelihood that the pixel is a part of the region of interest. The segmentation block 230 produces probability maps from the output tensors produced by the RNN block 225. The segmentation block 230 combines the features from the output tensors at multiple levels of resolution so that features at both coarse and refined levels contribute to the generation of segmentation results. The results of the segmentation block 230, i.e., the probability maps, represent a grid of values between 0 and 1, where each grid point is a pixel in an MR image and the value represents the probability that the pixel belongs to a region of interest. In some embodiments, the probability maps are stored in the feature store 210 and/or presented to the user on the user interface 215. The segmentation block 230 may also present and store the location of the predicted region of interest of each segmented image. For example, location coordinates describing a bounding box around the predicted region of interest. In some embodiments, the segmentation block 230 may label or map the segmented images to indicate the location of the predicted region of interest.

The CNN block 220 and RNN block 225 are trained and tested using images that are grouped by cycle. Training of the CNN block 220 may be conducted ahead of training the RNN block 225 to free GPU resource. Groups of images are randomly divided into training and validation sets using set ratios (e.g., an 80/20 ratio, 90/10 ratio, etc.). An Adam optimizer may be used in the training to minimize the cross-entropy loss. To reduce the effect of model variabilities, multiple CNN blocks (e.g, 5, 7, 10 models) may be trained using different random initializations. The same number of RNN blocks are then trained by initializing a RNN block from one of the CNN blocks. In testing, models are used to generate segmentations that are averaged and thresholded at a predetermined level of intensity (e.g., 0.5 out of 1). The accuracy of final segmentations is determined by comparing the results of the automatic segmentations to the results from the manual segmentations using various metrics. For example, the Dice similarity coefficient, the Hausdorff distance, and the average perpendicular distance may be used.

Figure 3A:
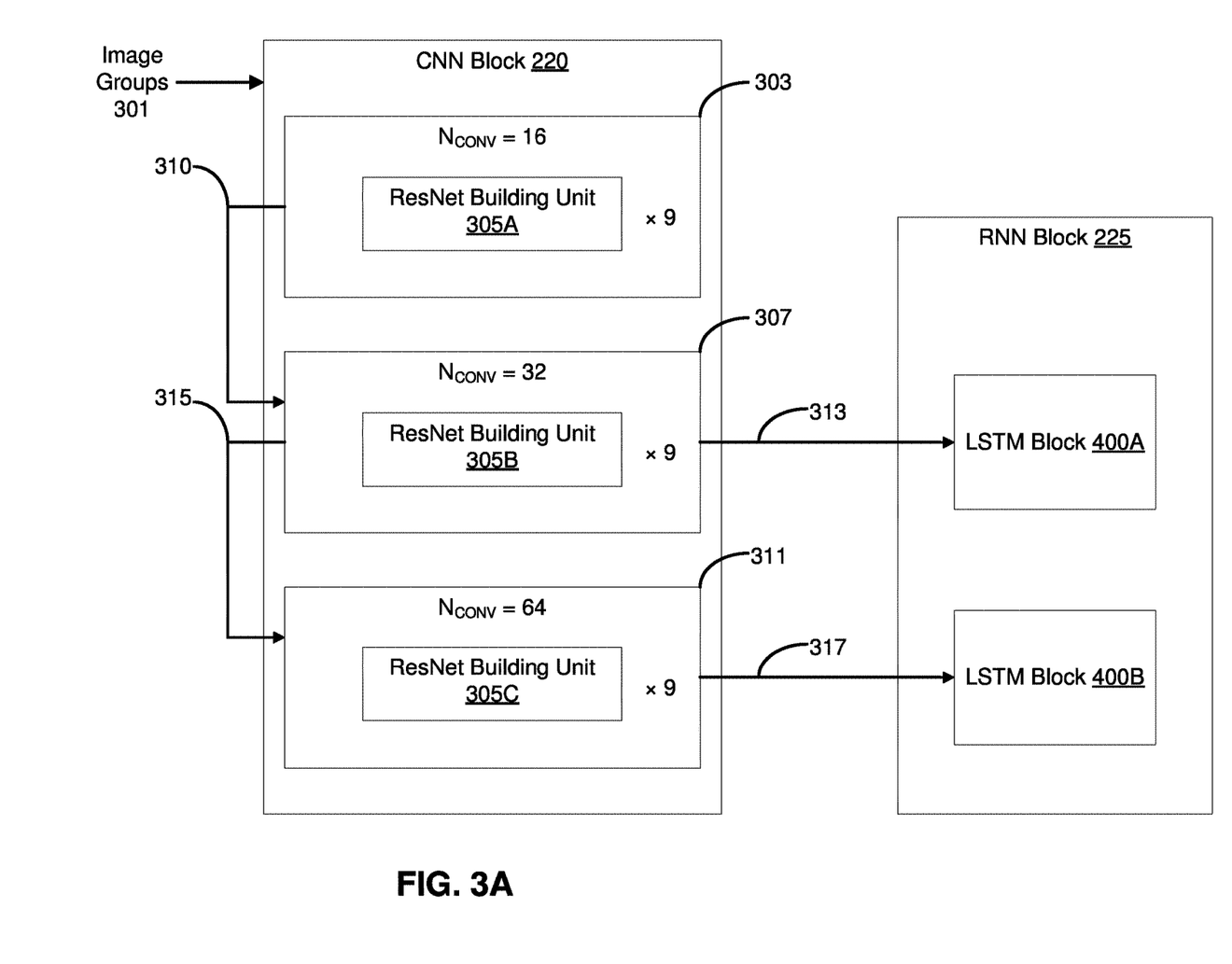
FIG. 3A is a block diagram of a CNN block, according to one embodiment.

FIG. 3A is a block diagram of a CNN block 220, according to one embodiment. The CNN block 220 generates primary feature maps at multiple levels of resolution for MR images. Primary feature maps are the downsampled feature maps produced by sub-blocks of the CNN block 220. To produce the primary feature maps, image groups 301 are fed into the CNN block 220. Each sub-bock of the CNN block 220 produces a feature map. Feature maps are downsampled by a predetermined factor, controlled by convolution stride size, to produce primary feature maps at two or more levels of resolution.

In some embodiments, the CNN block 220 consists of a fully convolutional 56-layer residual learning network constructed with sub-blocks, each containing multiple building units, i.e., ResNet building units. Each sub-block collectively produces a feature map for an image. Shortcuts within building units allow information to pass directly to the output, which allows the convolutional layers to learn the residual to the unit's output. Shortcuts also alleviate the gradient diminishing problem in training deep CNNs. In other embodiments, any CNN architecture that can effectively extract features from images and multiple levels of resolution may be used.

As shown, the CNN block 220 contains three sub-blocks, e.g., sub-block 303, sub-block 307, and sub-block 311. Each sub-block contains multiple building units. In the embodiment shown, the CNN block 220 contains three sub-blocks and each sub-block contains nine ResNet building units. For example, ResNet building unit 305A is one of nine building units in sub-block 303. Similarly, ResNet building unit 305B is one of nine building units in sub-block 307, and ResNet building unit 305C is one of nine building units in sub-block 311. In other embodiments, the CNN block 220 may contain more or fewer sub-blocks. Similarly, in other embodiments, each sub-block may contain more or fewer ResNet building units.

Figure 4A:
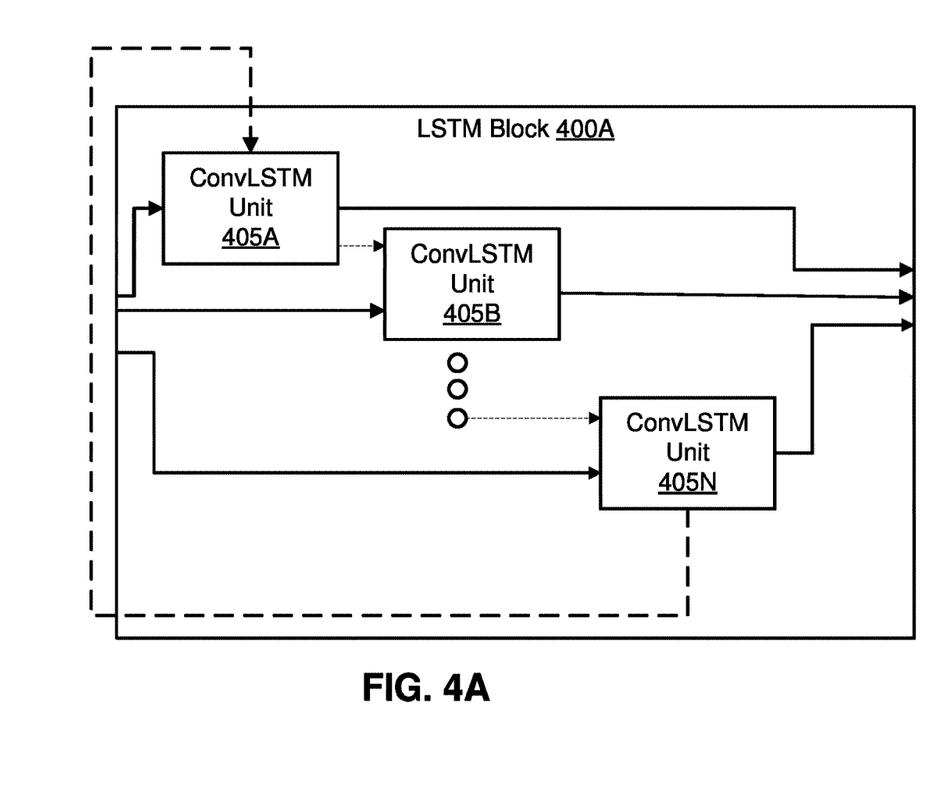
FIG. 4A is a block diagram illustrating a long short-term memory (LSTM) block, according to one embodiment.

To produce primary feature maps, image groups are fed into the first sub-block of the CNN block 220, e.g., sub-block 303. Sub-block 303 produces a feature map for each image in the image group. The feature map produced by sub-block 303 is downsampled 310 by a predetermined factor before it is passed to the second sub-block, e.g., sub-block 307. In embodiments where the data are processed by nine building units, the feature maps are downsampled by a factor of two. Other embodiments may include downsampling by a different factor. In these other embodiments, the CNN block will contain a corresponding number of sub-blocks. Images may be downsampled with a pooling layer (e.g., maxpooling, average pooling, L2-norm pooling, etc. The downsampled feature map is passed to the second sub-block, e.g., sub-block 307. A copy of the output of the second sub-block serves as a high-resolution primary feature map and is passed 313 to a LSTM block of the RNN block 225, e.g., LSTM block 400A. An additional copy of the output of the second sub-block is further downsampled 315 by a factor of two and passed to the third sub-block, e.g., sub-block 311. The output of the third sub-block serves as the low-resolution primary feature map and is passed 317 to an LSTM block of the RNN block 225, e.g., block 400B. To produce feature maps at subsequent levels of resolution, additional downsampling may be performed.

Figure 3B:
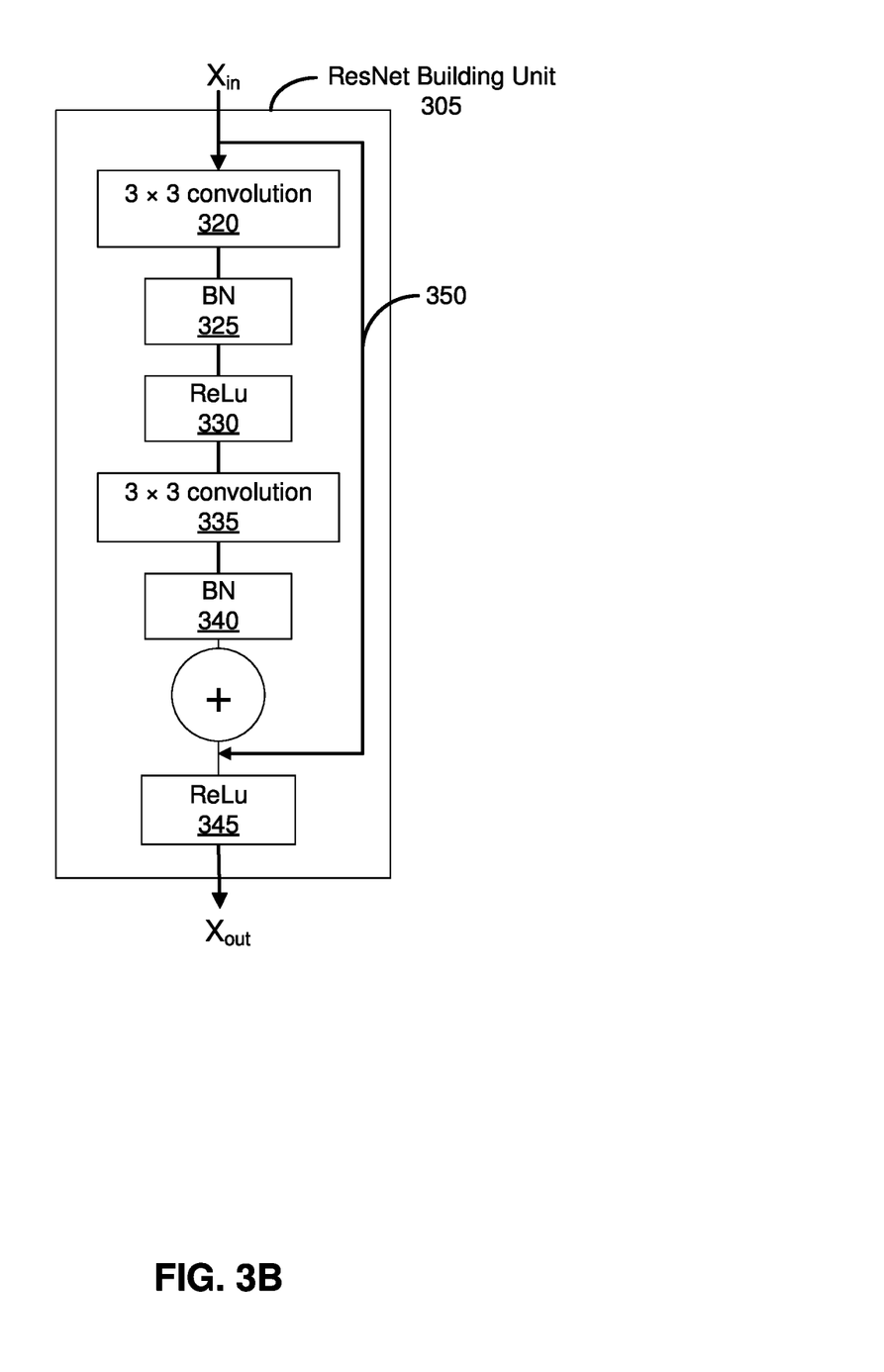
FIG. 3B is a block diagram of a ResNet building unit, according to one embodiment.

FIG. 3B is a block diagram of a ResNet building unit 305, according to one embodiment. The ResNet building unit 305 consists of one or more convolutional layers, e.g., the 3×3 convolutional layer 320 and the 3×3 convolutional layer 335, one or more batch normalization (BN) layers, e.g., BN layer 325 and BN layer 340, and one or more rectified linear units (ReLu), e.g., ReLu 330 and ReLu 345. The ResNet building unit 305 also includes a shortcut 350 that allows information to pass directly to the output. In other embodiments, different or additional layers may be included in the ResNet building unit 305.

The convolutional layers, e.g., 3×3 convolutional layer 320 and the 3×3 convolutional layer 335, extract image features from an image using a filter with a selected stride size. The stride size is the number of pixels that are shifted at each step. In the convolutional layers, each output pixel is the dot produce of the input and the filter. The BN layers, e.g., BN layer 325 and BN layer 340, speed and stabilize training. The input is normalized with zero mean and unit standard deviation, and it is scaled and shifted to allow the optimization to directly control the scale of the activation parameters. The ReLus, e.g., ReLu 330 and ReLu 34, include an activation function that is used to obtain the output of a node. The ReLus remove negative values from the input and replace them with zeros. Examples of ReLus include Noisily ReLus, leaky ReLus, parametric ReLus, ELUs, and the like.

FIG. 4A is a block diagram illustrating a LSTM block 400A, according to one embodiment. The LSTM block 400A is one example embodiment of an LSTM block and is one of the multiple LSTM blocks of the RNN block 225. Each LSTM block is dedicated to processing the primary feature maps at a corresponding level of resolution. The primary feature maps produced by the CNN block 220 are fed into the LSTM blocks of the RNN block 225. Each LSTM block, e.g., LSTM block 400A, produces an output tensor at a corresponding level of resolution.

LSTM blocks each include a series of LSTM units, e.g, ConvLSTM unit 405A, ConvLSTM unit 405B, and ConvLSTM unit 405N. The series of ConvLSTM units may have a length proportional to the number of frames in one cycle. For example, if there are 25 frames in a cycle, then each LSTM block has 25 ConvLSTM units. ConvLSTM units are units of RNN that propagate information from earlier time steps to aid in the analysis at later time steps. ConvLSTM units enable recurrent nets to continue learning through additional time steps and processing layers. Additionally, ConvLSTM units replace the matrix vector multiplication of conventional LSTM units with the convolution operation. This significantly reduces the number of parameters needed to learn while capturing the spatial relation between voxels more effectively. The ConvLSTM units may be serially connected such that the hidden state of the last ConvLSTM unit in the series is connected to the first unit to reflect the periodic motion of cycles in the image subject matter. For example, the last ConvLSTM unit, e.g., ConvLSTM unit 405N, is associated with the last frame in a cycle of motion, and precedes the first ConvLSTM unit, e.g., ConvLSTM unit 405A, that is associated with the first frame in a succeeding cycle of motion. The architecture of an ConvLSTM unit is further discussed below, with reference to FIG. 4B.

Figure 4B:
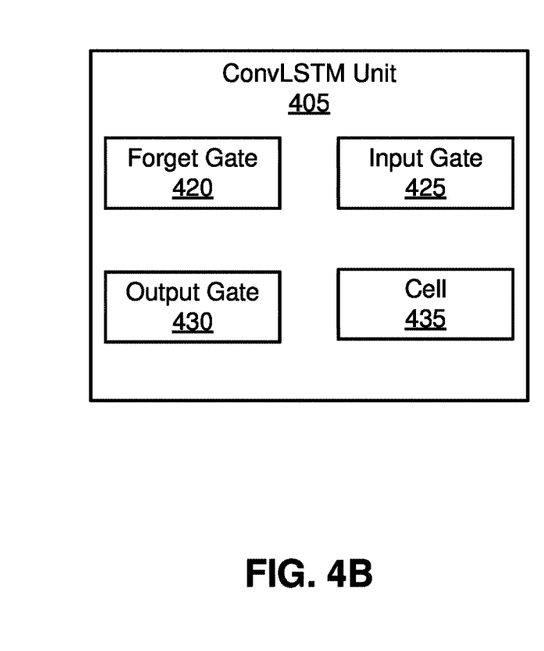
FIG. 4B is a block diagram illustrating a ConvLSTM unit, according to one embodiment.

FIG. 4B is a block diagram illustrating an ConvLSTM unit 405, according to one embodiment. One embodiment of a ConvLSTM unit, e.g., ConvLSTM unit 405, contains a forget gate 420, an input gate 425, an output gate 425, and a cell 435. The forget gate 420 controls the extent to which a value remains in the cell by determining what information is removed from the cell 435. The input gate 425 controls the extent to which a new value flows into the cell by determining what information comes into the cell 435. The output gate 430 controls the extent to which a value in the cell 435 is used to compute the activation function by determining what the cell 435 will output. In one embodiment, the output gate 430 outputs the image features as output tensors, each corresponding to one of the levels of resolution. The cell 435 serves as a memory unit, and keeps track of dependencies between elements in the input sequence. In one embodiment, the gates and cell are configured as follows:

$$i_t = \sigma(W_{xi}*X_t + W_{hi}*H_{t-1} + W_{ci} \circ C_{t-1} + b_i)$$

$$f_t = \sigma(W_{xf}*X_t + W_{hf}*H_{t-1} + W_{cf} \circ C_{t-1} + b_f)$$

$$C_t = f_t \circ C_{t-1} + i_t \circ \phi(W_{xc}*X_t + W_{hc}*H_{t-1} + b_c)$$

$$o_t = \sigma(W_{xo}*X_t + W_{ho}*H_{t-1} + W_{co} \circ C_{t-1} + b_o)$$

$$H_t = o_t \circ \phi(C_t)$$

where $i_t$ is the input gate, $f_t$ is the forget gate controlling the memory, $o_t$ is the output gate, and $C_t$ is the cell state. The symbol * represents the convolution operation, and ○ represents the matrix element-wise product. The convolutional operation, symbol *, replaces the matrix multiplication of conventional LSTM. Function σ calculates the element-wise sigmoid activation, and φ calculates the element-wise hyperbolic tangent activation. Matrix $X_t$ is the input fed from external sources, and $H_t$ is the hidden state carried over to the next ConvLSTM unit and used for generating output. The trainable parameters are the $W_{ij}$'s as weight matrices and the $b_j$'s as bias terms.

Figure 5:
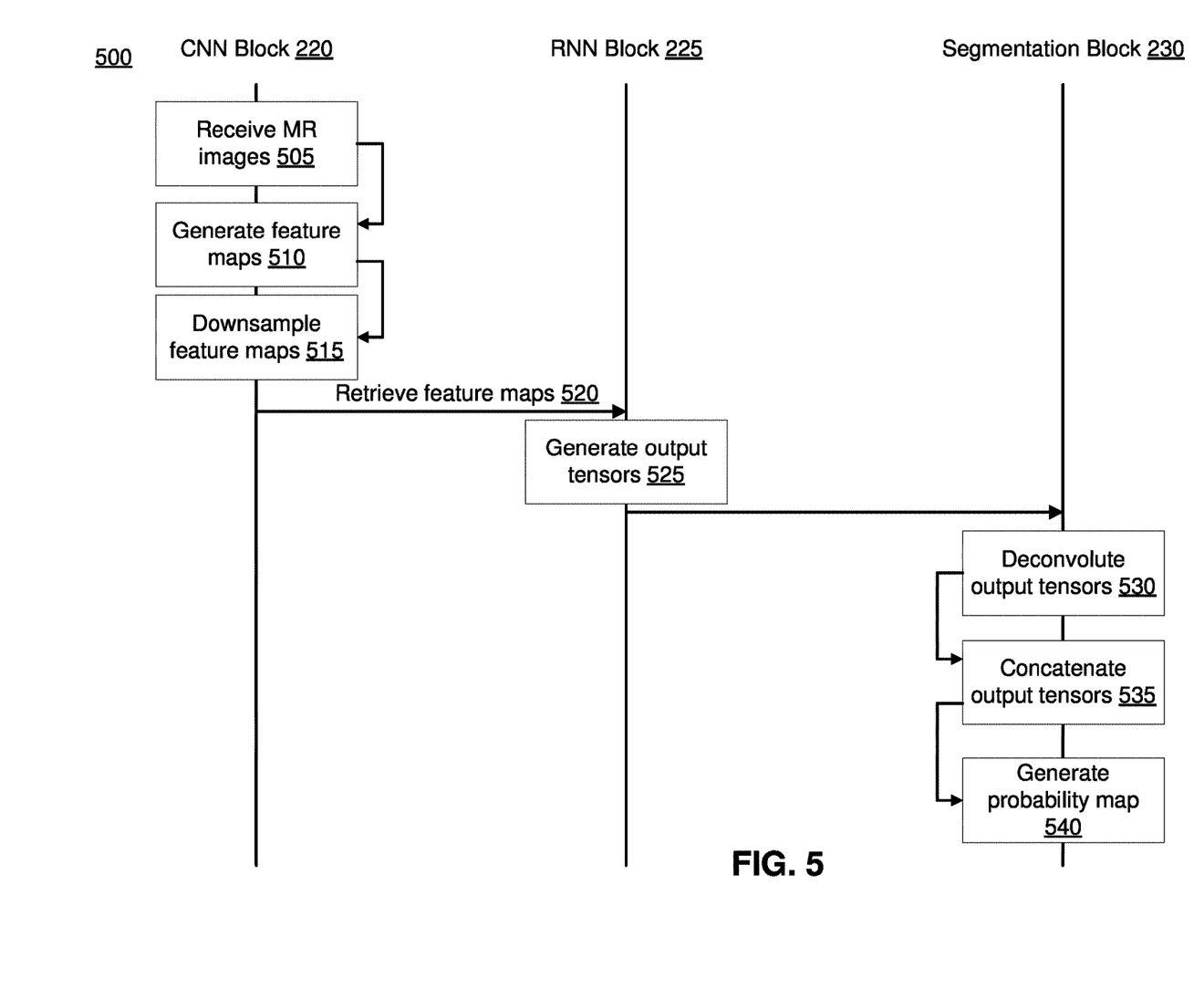
FIG. 5 is a diagram illustrating a method for segmenting MR images, according to one embodiment.

FIG. 5 is a diagram illustrating a method 500 for segmenting MR images, according to one embodiment. The CNN block 220 receives 505 MR images. The CNN block 220 may receive images from a user device 105 through a network, from the image store 205, or from the storage module 115. The CNN block 220 generates 510 feature maps. The CNN block 220 downsamples 515 the feature maps to produce primary feature maps at two or more levels of resolution. For example, the feature maps may be downsampled once to produce a high resolution primary feature map. The downsampled feature maps may be subsequently downsampled to produce primary feature maps at lower levels of resolution.

The RNN block 225 retrieves 520 the primary feature maps to generate 525 output tensors. The RNN block 225 generates 525 an output tensor for each corresponding level of resolution. The output tensors represent the features of the MR images. The segmentation block 230 deconvolutes 530 the output tensors to determine regions within an image that the RNN block 225 predicts correspond to a region of interest (e.g., the left ventricle of a heart in an MR image). In some embodiments, the output tensors at all corresponding levels of resolution are deconvoluted. In other embodiments, not all of the output tensors are deconvoluted. For example, the output tensor at the lower level of resolution may be deconvoluted and the output tensor at the higher level of resolution may not be deconvoluted before the two output tensors are concatenated. The segmentation block concatenates 535 the output tensors into a single output tensor. The segmentation block generates 540 a probability map for each MR image by deconvoluting the single output tensor and applying a sigmoid activation to the single output tensor. The results of the image segmentation represent a grid of values between 0 and 1, where each grid point is a pixel in an MR image and the value represents the probability that the pixel belongs to a region of interest.

Figure 6:
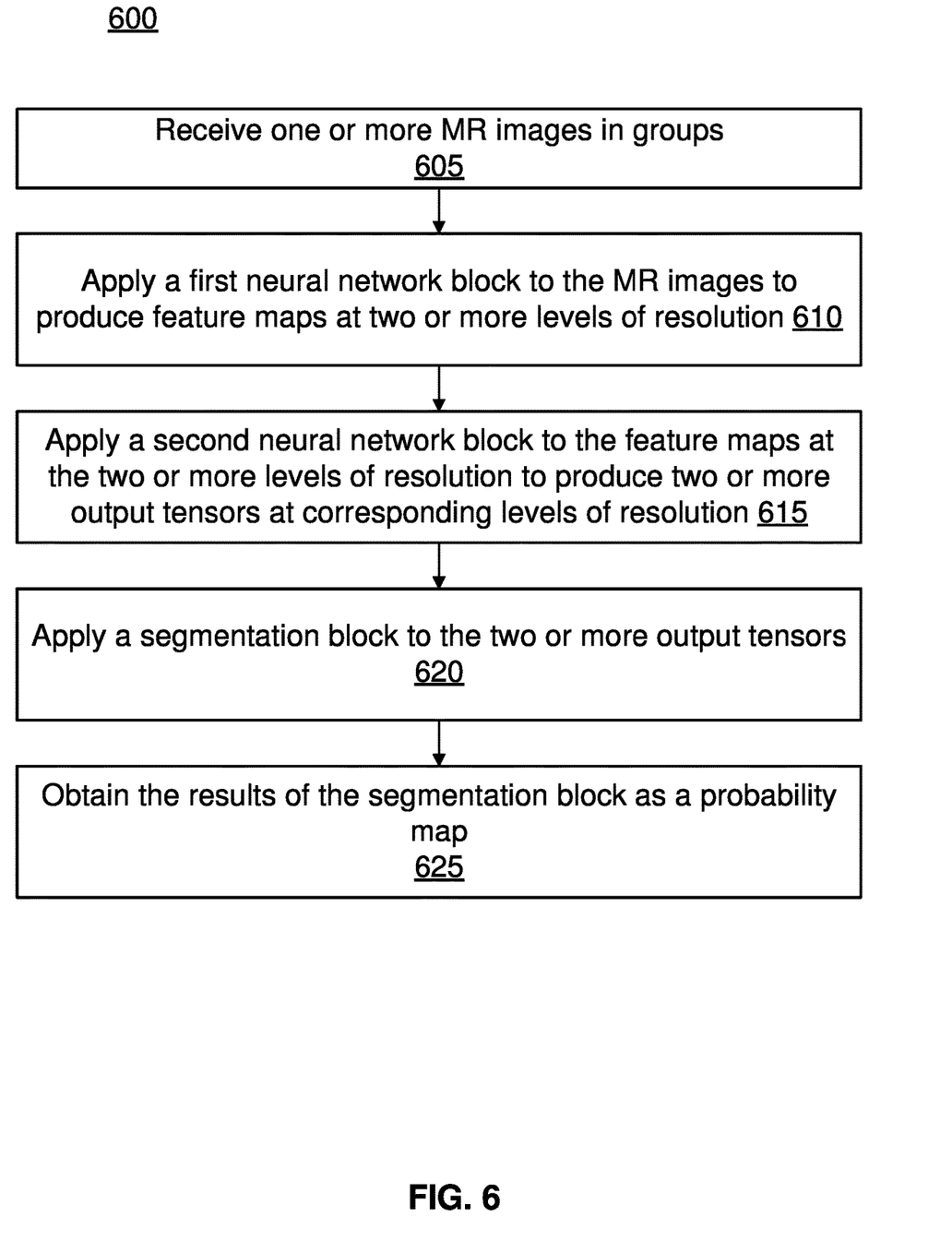
FIG. 6 is a flowchart of a method for segmenting MR images, according to one embodiment.

FIG. 6 is a flowchart of a method 600 for segmenting MR images, in accordance with an embodiment. The steps of FIG. 6 are illustrated from the perspective of the image segmentation system 125 performing the method 600. However, some or all of the steps may be performed by other entities and/or components. In addition, some embodiments may perform the steps in parallel, perform the steps in different orders, or perform different steps.

In the embodiment shown in FIG. 6, one or more MR images are received 605 in groups. MR images in a group may correspond to a cycle of motion and may have a temporal order. A first neural network block is applied 610 to the MR images to produce feature maps at two or more levels of resolution. In some embodiments, the first neural network is a CNN block. A second neural network block is applied 615 to the feature maps at the two or more levels of resolution to produce two or more output tensors at corresponding levels of resolution. In some embodiments, the second neural network block is a convolutional long short-term memory (ConvLSTM) block. A segmentation block is applied 620 to the two or more output tensors. In some embodiments, the segmentation block concatenates the two or more output tensors at corresponding levels of resolution into an output tensor, deconvolutes the output tensor, and applies a sigmoid activation function to the output tensor to produce a probability map. The results of the segmentation block are obtained 625 as a probability map.

Figure 7:
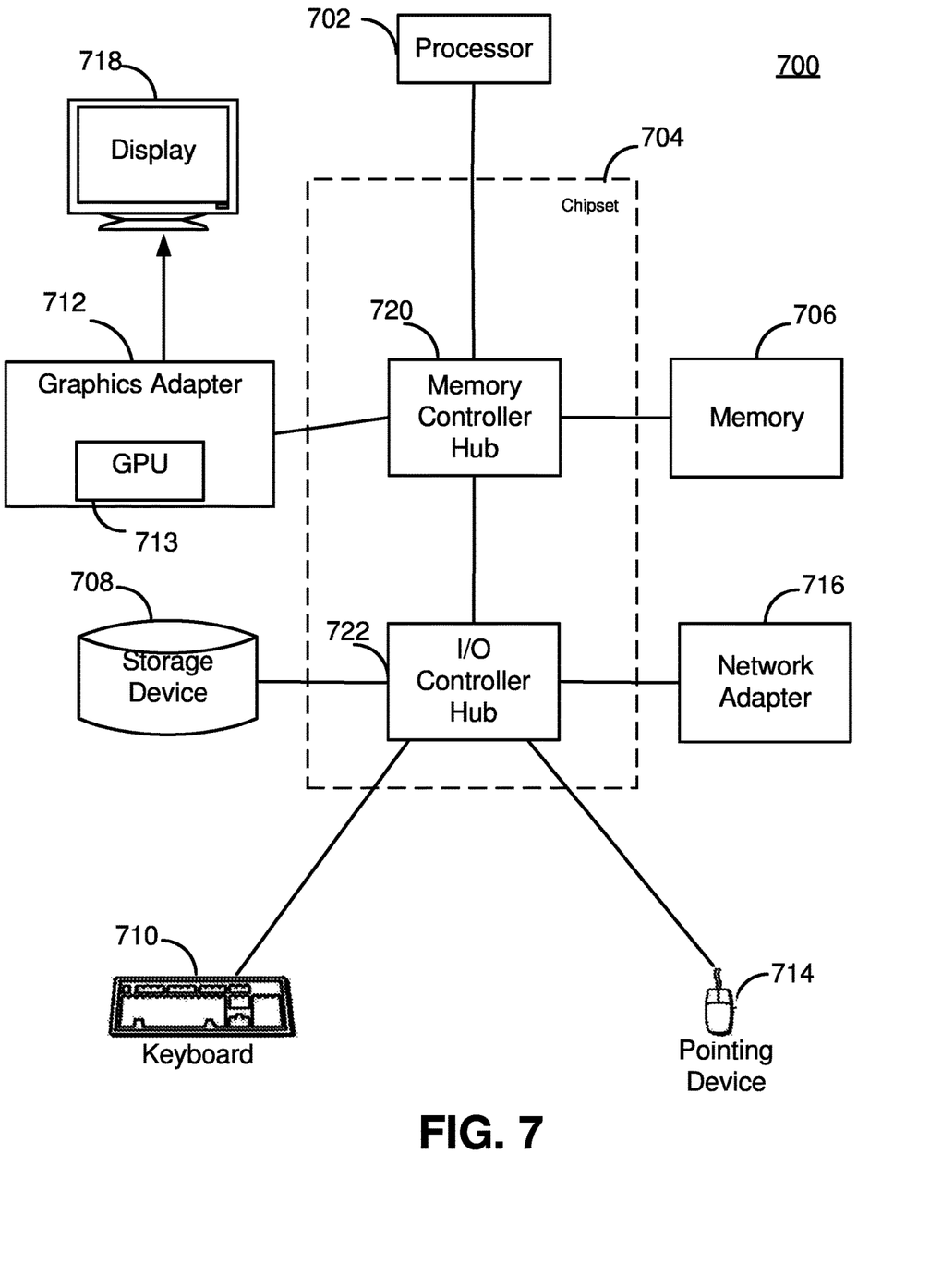
FIG. 7 is a high-level block diagram illustrating the computer logic components of an image segmentation system, according to one embodiment.

FIG. 7 is a high-level block diagram illustrating an example computer 700 suitable for implementing the entity of FIG. 1. The example computer 700 includes at least one processor 702 coupled to a chipset 704. The chipset 704 includes a memory controller hub 720 and an input/output (I/O) controller hub 722. A memory 706 and a graphics adapter 712, which contains a graphics processing unit (GPU) 713, are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, touch-screen, or other type of pointing device, and is used in combination with the keyboard 710 (which may be an on-screen keyboard) to input data into the computer 700. The graphics adapter 712 displays images and other information on the display 718. The network adapter 716 couples the computer 700 to one or more computer networks.

The GPU 713 in the graphics adapter 712 may be used for other high-performance computation as well as processing graphical data for presentation on the display 718. In one embodiment, the GPU 713 is used to process data from the image segmentation system 125, where it is used to accelerate model training, image processing, and image segmentation.

The types of computers used by the entities of FIG. 7 can vary depending upon the embodiment and the processing power required by the entity. For example, the image segmentation system 125 might include a desktop computer to provide the functionality described. Furthermore, the computers can lack some of the components described above, such as keyboards 710, graphics adapters 712, and displays 718.

What is claimed is:

1. A computer-implemented method of image segmentation comprising:
   receiving magnetic resonance (MR) images in groups;
   applying a first neural network block to the MR images to produce feature maps at two or more levels of resolution;
   applying a second neural network block to the feature maps at the two or more levels of resolution to produce two or more output tensors at corresponding levels of resolution;
   applying a segmentation block to the two or more output tensors to generate results; and
   obtaining the results of the segmentation block as a probability map.

2. The method of claim 1, wherein the second neural network block is a recurrent neural network (RNN) block that was trained by:
   initializing weights of the RNN block with initial values;
   applying the first neural network block to a set of MR images;
   applying the RNN block to output from the first neural network block;
   applying a segmentation block to the output of the RNN block to generate predictions of a location of a feature within each MR image in the set of MR images; and
   updating the weights of the RNN block based on the predictions.

3. The method of claim 1, wherein the second neural network block is a convolutional LSTM block.

4. The method of claim 1, wherein applying the segmentation block comprises:
   concatenating the two or more output tensors at corresponding levels of resolution into an output tensor;
   deconvoluting the output tensor; and
   applying a sigmoid activation function to the output tensor to produce a probability map.

5. The method of claim 1, wherein the first neural network block is a CNN block.

6. The method of claim 1, further comprising:
   preprocessing MR images, wherein preprocessing includes at least one of: resampling, cropping, performing motion analysis, or performing transforms.

7. The method of claim 1, wherein the images in a given group of MR images correspond to a cycle and have a temporal order, and the first neural network block is applied to the MR images in the given group in the temporal order.

8. A non-transitory computer-readable storage medium containing computer program code comprising instructions that, when executed by a processor, causes the processor to:
   receive magnetic resonance (MR) images in groups;
   apply a neural network block to MR images to produce primary feature maps at two or more levels of resolution;
   apply a RNN block to the primary feature maps at the two or more levels of resolution to produce two or more output tensors at corresponding levels of resolution;
   apply a segmentation block to the two or more output tensors to generate results; and
   obtain the results of the segmentation block as a probability map.

9. The non-transitory computer-readable storage medium of claim 8, wherein the RNN block was trained by:
   initializing weights of the RNN block with initial values;
   applying the neural network block to a set of MR images;
   applying the RNN block to output from the neural network block;
   applying a segmentation block to the output of the RNN block to generate predictions of a location of a feature within each MR image in the set of MR images; and
   updating the weights of the RNN block based on the predictions.

10. The non-transitory computer-readable storage medium of claim 8, wherein the RNN block is a convolutional LSTM block.

11. The non-transitory computer-readable storage medium of claim 8, wherein the instructions that cause the processor to apply the segmentation block comprise instructions that cause the processor to:
    concatenate the two or more output tensors at corresponding levels of resolution into an output tensor;
    deconvolute the output tensor; and
    apply a sigmoid activation function to the output tensor to produce a probability map.

12. The non-transitory computer-readable storage medium of claim 8, wherein the neural network block is a CNN block.

13. The non-transitory computer-readable storage medium of claim 8, wherein the computer program code further comprises instructions that, when executed by the processor, causes the processor to:
    preprocess MR images, wherein preprocessing includes at least one of: resampling, cropping, performing motion analysis, or performing transforms.

14. The non-transitory computer-readable storage medium of claim 8, wherein the images in a given group of MR images correspond to a cycle and have a temporal order, and the neural network block is applied to the MR images in the given group in the temporal order.

15. An image segmentation system comprising:
    a processor; and
    a non-transitory computer-readable medium containing instructions that, when executed by the processor, cause the image segmentation system to:
    receive magnetic resonance (MR) images in groups;
    apply a first neural network block to the MR images to produce feature maps at two or more levels of resolution;
    apply a second neural network block to the feature maps at the two or more levels of resolution to produce two or more output tensors at corresponding levels of resolution;
    apply a segmentation block to the two or more output tensors; and
    obtain results of the segmentation block as a probability map.

16. The system of claim 15, wherein the second neural network block is a recurrent neural network (RNN) block that was trained by:
    initializing weights of the RNN block with initial values;

applying the first neural network block to a set of MR images;

applying the RNN block to output from the first neural network block;

applying a segmentation block to the output of the RNN block to generate predictions of a location of a feature within each MR image in the set of MR images; and updating the weights of the RNN block based on the predictions.

17. The system of claim 15, wherein the second neural network block is a convolutional LSTM block.

18. The system of claim 15, wherein the instructions that cause the image segmentation system to apply the segmentation block comprise instructions that cause the image segmentation system to:

concatenate the two or more output tensors at corresponding levels of resolution into an output tensor;

deconvolute the output tensor; and apply a sigmoid activation function to the output tensor to produce a probability map.

19. The system of claim 15, wherein the non-transitory computer-readable medium further comprises instructions that, when executed by the processor, causes the image segmentation system to:

preprocess MR images including at least one of: resampling, cropping, performing motion analysis, or performing transforms.

20. The system of claim 15, wherein the images in a given group of MR images correspond to a cycle and have a temporal order, and the first neural network block is applied to the MR images in the given group in the temporal order.

* * * * *

UNITED STATES PATENT AND TRADEMARK OFFICE
CERTIFICATE OF CORRECTION

PATENT NO. : 11,030,750 B2  
APPLICATION NO. : 16/427171  
DATED : June 8, 2021  
INVENTOR(S) : Antong Chen et al.

Page 1 of 1

It is certified that error appears in the above-identified patent and that said Letters Patent is hereby corrected as shown below:

On the Title Page

Item (73), in Column 1, in "Assignees", Line 3, delete "(KR)" and insert -- (SG) --, therefor.

Signed and Sealed this  
Sixteenth Day of November, 2021

Drew Hirshfeld  
*Performing the Functions and Duties of the*  
*Under Secretary of Commerce for Intellectual Property and*  
*Director of the United States Patent and Trademark Office*